United States Patent
Aloe et al.

[11] Patent Number: 6,062,634
[45] Date of Patent: May 16, 2000

[54] AUTOMOTIVE ENERGY ABSORBING STRUCTURE

[75] Inventors: Alan S. Aloe, Waterford; Keith Redden, Pointe Aux Pins; James J. Johnson, Metamora, all of Mich.; Richard A. Sokol, Harrison City, Pa.; Matthew P. Kiley; Andrew B. Trageser, both of Pittsburg, Pa.; Gerald Budnick, Sterling Heights; James J. Shavrnoch, Frankenmuth, both of Mich.

[73] Assignees: DaimlerChrysler Corporation, Auburn Hills, Mich.; Aluminum Company of America, Alcoa Center, Pa.

[21] Appl. No.: 08/971,896

[22] Filed: Nov. 17, 1997

[51] Int. Cl.$^7$ ...................................... B62D 25/08
[52] U.S. Cl. ...................... 296/203.02; 296/194; 296/189
[58] Field of Search ...................................... 293/132, 102, 293/1, 24, 38, 117, 146; 296/188, 189, 194, 203.02; 280/784

[56] References Cited

U.S. PATENT DOCUMENTS

| | | | |
|---|---|---|---|
| 1,443,362 | 1/1923 | Heinrich | 293/146 |
| 1,556,780 | 10/1925 | Girl | 293/146 |
| 1,566,533 | 12/1925 | Grotenhuis | 293/146 |
| 1,712,671 | 5/1929 | McCloud | 293/146 X |
| 2,220,272 | 11/1940 | Pitura et al. | |
| 3,098,675 | 7/1963 | Gerin | 296/188 |
| 3,797,873 | 3/1974 | Cook | 293/63 |
| 3,831,997 | 8/1974 | Myers | 396/28 R |
| 3,848,886 | 11/1974 | Feustel et al. | 280/106 R |
| 3,860,258 | 1/1975 | Feustel et al. | 280/106 R |
| 3,877,741 | 4/1975 | Wilfert et al. | 293/89 |
| 4,168,855 | 9/1979 | Koch | 293/115 |
| 4,428,599 | 1/1984 | Jahnle | 280/784 |
| 4,431,221 | 2/1984 | Jahnle | 293/122 |
| 5,314,229 | 5/1994 | Matuzawa et al. | 296/189 |
| 5,403,049 | 4/1995 | Ebbinghaus | 293/133 |
| 5,579,699 | 12/1996 | Dannawi et al. | 105/416 |
| 5,727,826 | 3/1998 | Frank et al. | 293/102 |

*Primary Examiner*—Dennis H. Pedder
*Assistant Examiner*—Mickki D. Morray
*Attorney, Agent, or Firm*—Jennifer M. Stec

[57] ABSTRACT

Automotive front end structure adapted to be mounted on an automotive vehicle frame to absorb impact energy. The structure includes first and second crush hoops each having a central portion and side portions extending rearwardly from the central portion. The rear ends of the side portions of each hoop are connected to brackets and then to first and second crush boxes. Brackets connect the crush boxes to the vehicle frame. The crush hoops and the crush boxes are adapted to crush and collapse to absorb energy in a frontal impact. The central portion of the first crush hoop projects forwardly a greater distance than the central portion of the second crush hoop so that the first crush hoop is first to deform in a front impact. Thereafter, the other hoop begins to load and dissipate energy to provide a smooth, continuous and progressive reaction force to front end deformation.

18 Claims, 4 Drawing Sheets

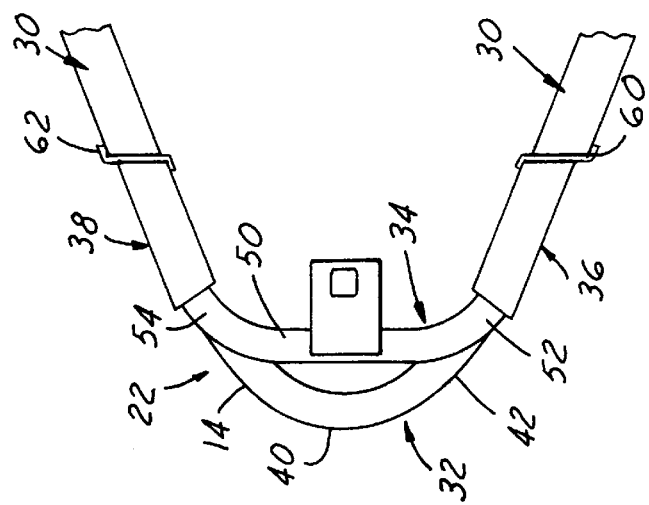
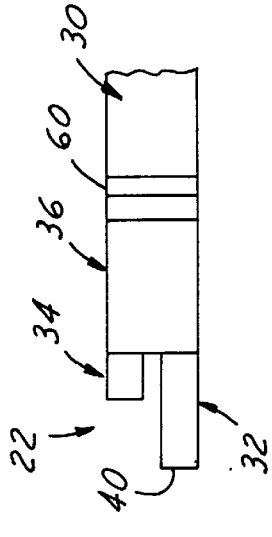
FIG.7A  FIG.7B
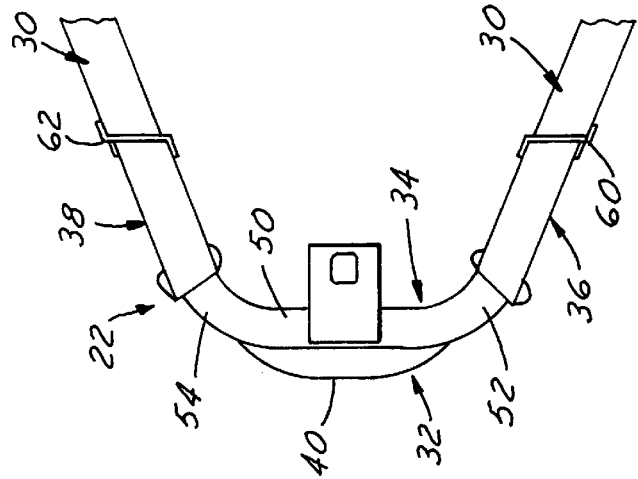
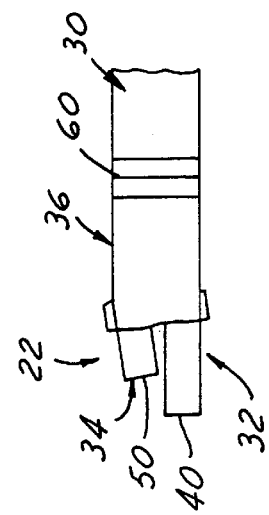
FIG.8A  FIG.8B
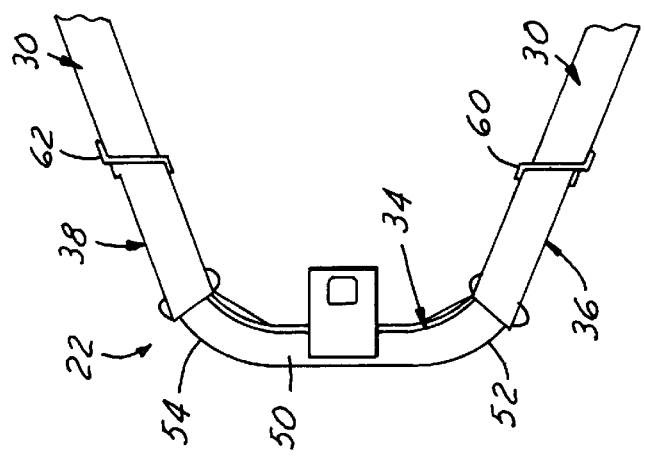
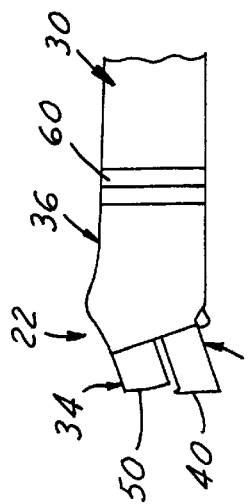
FIG.9A  FIG.9B

AUTOMOTIVE ENERGY ABSORBING STRUCTURE

FIELD OF INVENTION

This invention relates generally to impact absorbing structure and more particularly to automotive front end structure adapted to be mounted on the frame of an automotive vehicle to absorb impact energy.

BACKGROUND OF THE INVENTION

In typical front end constructions for automotive vehicles, reaction forces in a frontal impact will peak early and then fall off sharply as further impact forces are absorbed. What is needed is an automotive front end construction which will avoid the peak and sharp fall off in energy absorption and instead provide a smooth, continuous and progressive reaction force to front end deformation.

SUMMARY OF THE INVENTION

In accordance with the present invention, two crush hoops are employed, one projecting forwardly a greater distance than the other. The more forwardly projecting hoop is first to dissipate energy in a frontal impact. Then the other hoop begins to load and dissipate energy. Preferably, the ends of the two hoops are connected to crush boxes which deform and dissipate additional energy. The result is a smooth and progressive absorption of energy throughout the duration of the frontal impact.

One object of this invention is to provide automotive front end structure for absorbing impact energy having the foregoing features and capabilities.

Another object is to provide automotive front end structure for absorbing impact energy which is composed of a relatively few simple parts, is capable of absorbing energy in a smooth and progressive manner, and is relatively inexpensive to manufacture and easy to install.

These and other objects, features and advantages of the invention will become more apparent as the following description proceeds, especially when considered with the accompanying drawings.

BRIEF DESCRIPTION OF THE DRAWINGS

FIGS. 7A and 7B are respectively semi-diagrammatic top plan and side elevational views of the front end energy absorption structure prior to impact.

FIGS. 8A and 8B are respectively semi-diagrammatic top plan and side elevational views of the front end impact absorbing structure after initial impact with one of the crush hoops.

FIGS. 9A and 9B are respectively semi-diagrammatic top plan and side elevational views of the front end impact absorbing structure after the more forwardly projecting hoop has been crushed and collapsed back to the position of the other crush hoop.

DETAILED DESCRIPTION OF THE PREFERRED EMBODIMENT

Figure 1:
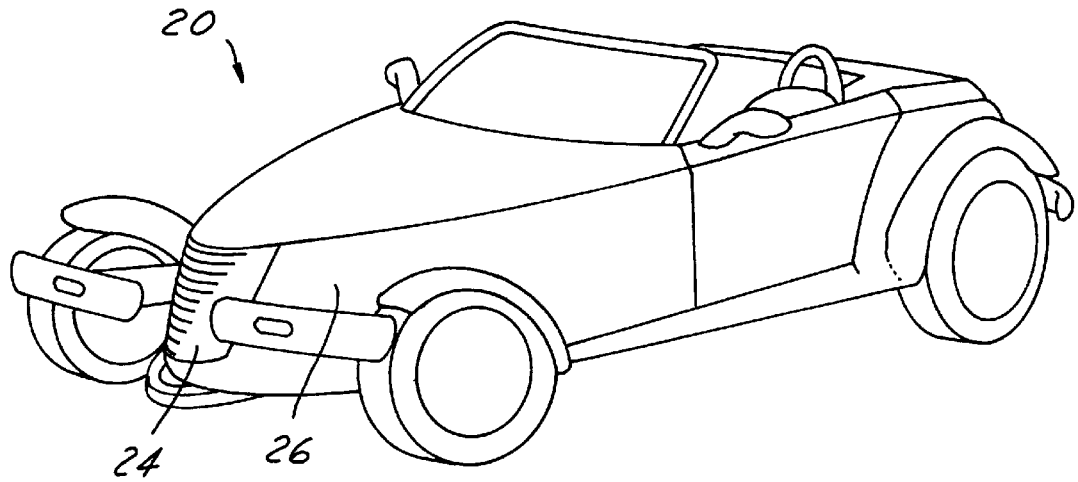
FIG. 1 is a perspective view of an automotive vehicle having the front end structure of the present invention, which structure is concealed in this view.
Figure 2:
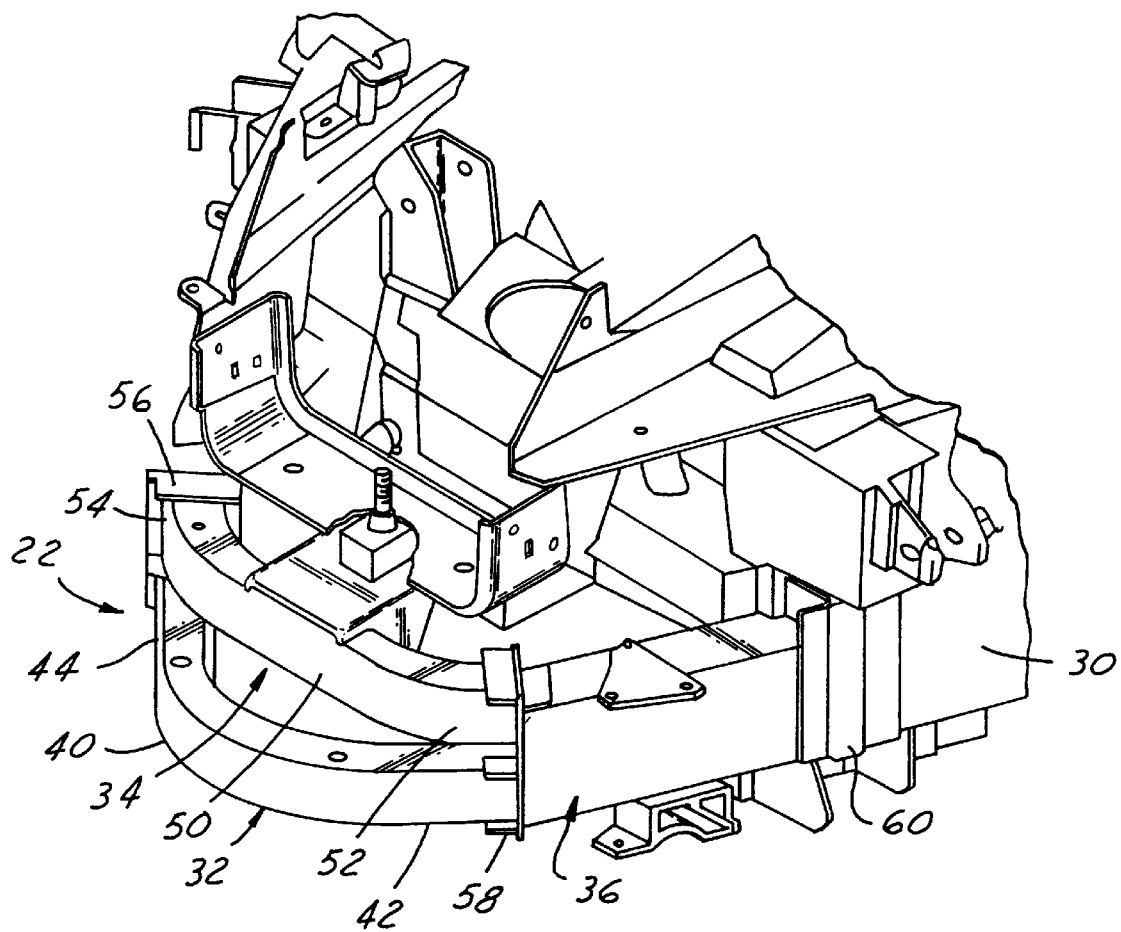
FIG. 2 is a perspective view of a portion of the front end of the vehicle, showing the structure immediately behind the body paneling and grill work of the vehicle in FIG. 1, such structure including the front end structure of this invention for absorbing energy.
Figure 3:
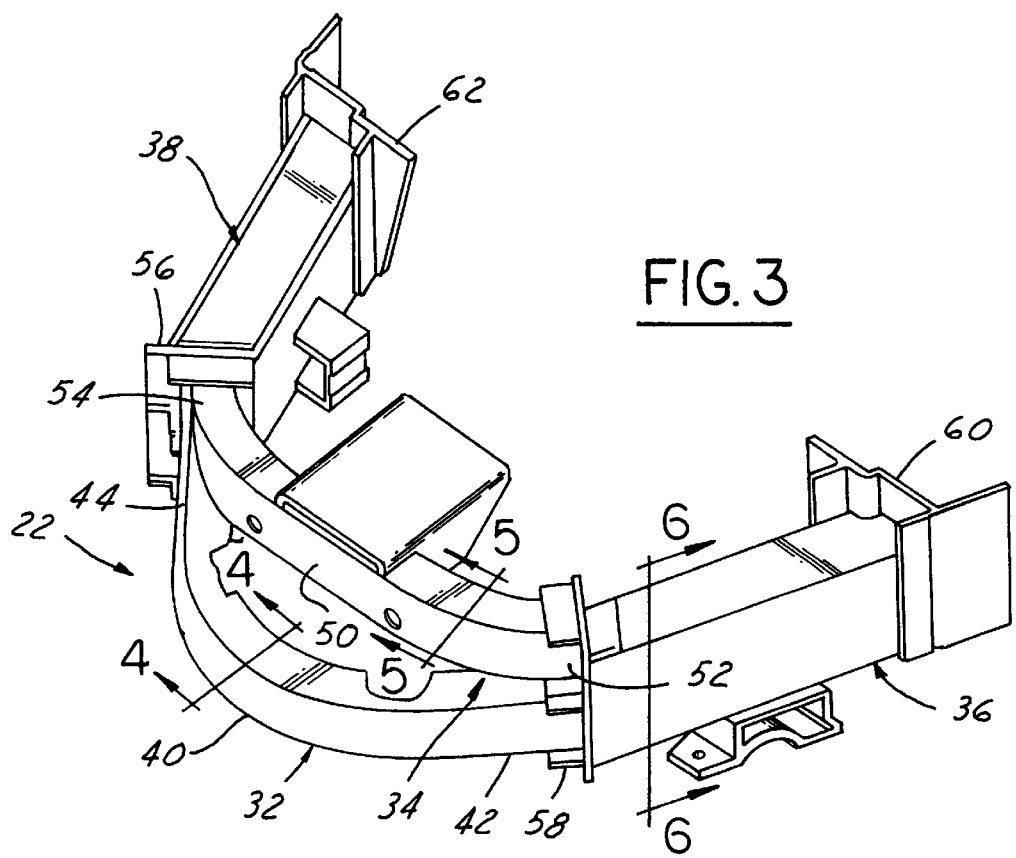
FIG. 3 is a view similar to FIG. 2, but with parts removed for the purpose of more clearly showing the energy absorbing structure of this invention.
Figure 4:
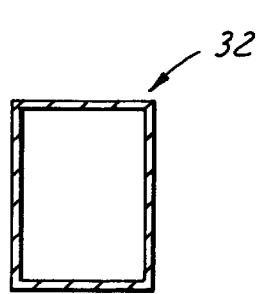
FIG. 4 is a sectional view taken on the line 4—4 in FIG. 3.
Figure 5:
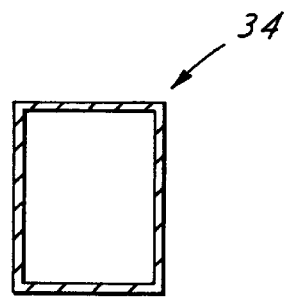
FIG. 5 is a sectional view taken on the line 5—5 in FIG. 3.
Figure 6:
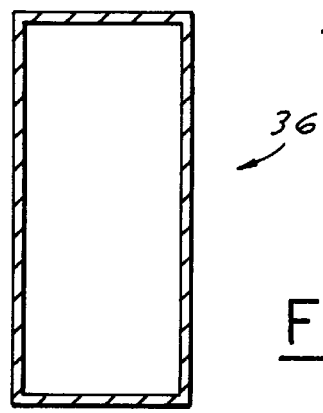
FIG. 6 is a sectional view taken on the line 6—6 in FIG. 3.

Referring now more particularly to the drawings, the automotive vehicle 20 has front end energy absorbing structure 22 immediately behind the grill 24 and body paneling 26 at the front of the vehicle. The energy absorbing structure 22 is rigidly secured to the vehicle frame 30.

The energy absorbing structure 22 comprises vertically spaced lower and upper crush hoops 32 and 34, and crush boxes 36 and 38.

The lower crush hoop 32 is elongated and of hollow, rectangular tubular form, and is preferably an aluminum extrusion. The central portion 40 of the crush hoop 32 is arcuately and outwardly or forwardly convex. Side portions 42 and 44 of the crush hoop extend rearwardly and in substantially straight line continuation of the extremities of the central portion. The side portions flare laterally outwardly in a rearward direction at an acute angle to the longitudinal centerline of the vehicle. The crush hoop 32 is horizontal and is centered on and symmetrical with the longitudinal centerline of the vehicle.

The upper crush hoop 34 is elongated and of hollow, rectangular tubular form, and is also preferably an aluminum extrusion. The central portion 50 of the crush hoop 34 is blunt, that is, it is substantially flat and straight, extending perpendicular to the longitudinal centerline of the vehicle. Arcuate side portions 52 and 54 of the crush hoop 34 are outwardly or forwardly convex and extend rearwardly from the central portion 50. The side portions 52 and 54 flare laterally outwardly in a rearward direction at an acute angle to the longitudinal centerline of the vehicle. The crush hoop 34 is centered on and symmetrical with the longitudinal centerline of the vehicle.

Throughout their lengths, the crush hoops 32 and 34 are not connected to one another although their ends are connected to the crush boxes 36 and 38. More specifically, the rear ends of the side portions 42 and 44 of the crush hoop 32 are rigidly secured to brackets 56 and 58 which are rigidly secured to the respective crush boxes 36 and 38, as by welding. The rear ends of the side portions 52 and 54 of the crush hoop 34 are rigidly secured to the brackets 56 and 58 which are rigidly secured to the respective crush boxes 36 and 38 as by welding.

The crush boxes 36 and 38 are preferably of hollow, rectangular tubular form, and are preferably aluminum extrusions. The crush boxes 36 and 38 are spaced apart equal distances on opposite sides of the longitudinal centerline of the vehicle.

Brackets 60 and 62 rigidly secure the respective crush boxes 36 and 38 to the vehicle frame 30.

FIGS. 7A and 7B show the impact absorbing structure 22 prior to a frontal impact. As there shown, the central portion 40 of the lower crush hoop 32 projects forwardly a greater distance than the central portion 50 of the crush hoop 34 and, accordingly, the central portion of the lower crush hoop 32 will be the first to be deformed in a frontal impact.

FIGS. 8A and 8B show the energy absorbing structure 22 after initial deformation of the central portion of the lower crush hoop 32. There will be some collapse and crushing of the crush boxes 36 and 38 at this point.

FIGS. 9A and 9B are similar to FIGS. 8A and 8B but show the condition of the energy absorbing structure after the central portion 40 of the crush hoop 32 has been deformed back to approximately the position of the central portion 50 of the upper crush hoop 34. At this stage, there will be further deformation and collapse of the crush hoop 32, possibly some additional collapse and deformation of the crush boxes 36 and 38, but still no collapse or crushing of the upper crush hoop 34.

Figure 10A:
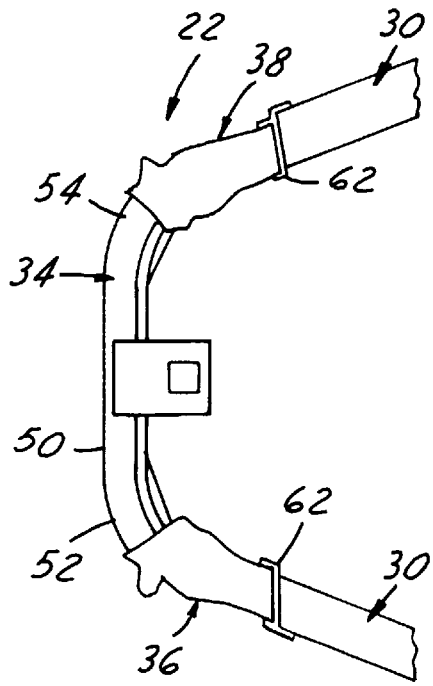
FIGS. 10A and 10B are respectively semi-diagrammatic top plan and side elevational views of the front end impact absorbing structure after further deformation of the more forwardly projecting hoop, and initial deformation of the second of the crush hoops and of the crush boxes.
Figure 10B:
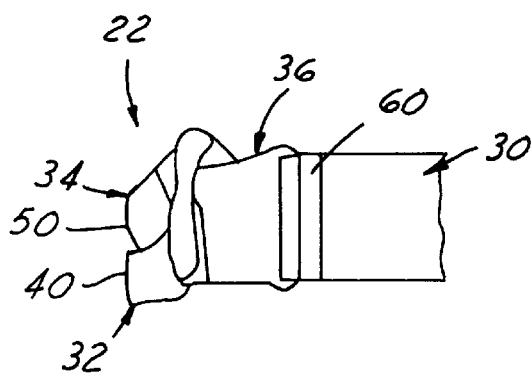

FIGS. 10A and 10B show the condition of the energy absorbing structure after continued collapse and crushing of the lower crush hoop 32 and of the crush boxes 36 and 38, and some initial collapse and crushing of the crush hoop 34 after loading of the central portion thereof.

Figure 11A:
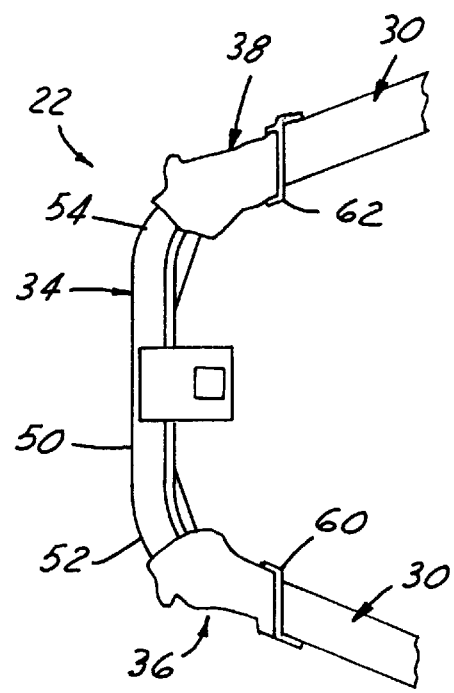
FIGS. 11A and 11B are respectively semi-diagrammatic top plan and side elevational views showing the front end energy absorbing structure after further deformation of both crush hoops and both crush boxes.
Figure 11B:
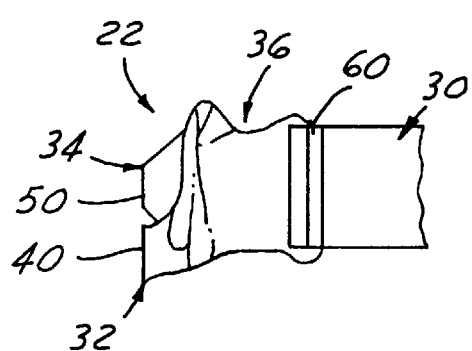

FIGS. 11A and 11B show the condition of the energy absorbing structure 22 after further collapse and crushing of both crush hoops 32 and 34 and both crush boxes 36 and 38.

The result of this construction is a smooth, continuous and progressive absorption of energy as first one and then both of the crush hoops are loaded and deformed in a frontal impact. The crush hoops are separate and free of connection to one another except at the ends which are connected to the end brackets 56 and 58 that are connected to the crush boxes. The crush hoops thus operate independently of one another. First one crushes and collapses without affecting the other, and then on further impact, the other crushes and collapses so that the two cooperate in the final stages of energy absorption.

What is claimed is:

1. Automotive front end structure constructed and arranged for mounting forwardly of and on a front end of an automotive vehicle frame to absorb frontal impact energy, comprising an elongated first crush hoop having a central portion and side portions extending rearwardly from said central portion in horizontally spaced apart relation and each having a rear end for operable connection to and support by the front end of the vehicle frame, and an elongated second crush hoop vertically spaced from said first crush hoop having a central portion and side portions extending rearwardly from the central portion thereof in horizontally spaced apart relation and each having a rear end oriented for operable connection to and support by the front end of the vehicle frame, the central portion of said first crush hoop also being horizontally as well as vertically spaced apart from the central portion of said second crush hoop and projecting forwardly away from the vehicle front end by a greater distance than that of the central portion of said second hoop, said crush hoops being free of operable support connection for one another, said first and second hoops, when in use operably connected to and supported by the front end of the vehicle frame, being frontally unobstructed by one another and supported independently of one another and thereby adapted to crush and collapse initially sequentially to thereby smoothly, continuously and progressively absorb energy in a frontal impact as said first and then both of said crush hoops are independently loaded and deformed in a frontal impact.

2. Automotive front end structure as defined in claim 1, wherein said crush hoops are of hollow, tubular form.

3. Automotive front end structure as defined in claim 2, wherein said crush hoops are aluminum extrusions.

4. Automotive front end structure as defined in claim 3, wherein said hoops are disposed in vertically spaced, horizontal planes.

5. Automotive front end structure as defined in claim 1, and further comprising horizontally spaced apart first and second crush boxes, the side portions of each of said hoops having their rear ends operably secured for support to a respectively associated front end of each of said respective first and second crush boxes, said first and second crush boxes being constructed and arranged when in use on the front end of the vehicle frame to crush and collapse to absorb energy in a frontal impact, and mounting means for securing a rear end of each of said crush boxes to the vehicle frame.

6. Automotive front end structure as defined in claim 5, wherein said crush boxes are hollow.

7. Automotive front end structure as defined in claim 6, wherein said crush boxes comprise aluminum extrusions.

8. Automotive front end structure as defined in claim 7, wherein the central portion of said first crush hoop is arcuately and outwardly convex and the side portions thereof flare laterally outwardly in a rearward direction, and the central portion of said second crush hoop is blunt and the side portions thereof are arcuate and outwardly convex and flare laterally outwardly in a rearward direction.

9. Automotive front end structure as defined in claim 8, wherein said hoops are disposed in vertically spaced, horizontal planes.

10. Automotive front end structure as defined in claim 1, wherein said crush hoops are free of connection to one another except at their rear ends and are operably supported independently of one another.

11. Automotive front end structure constructed and arranged for mounting forwardly of and on a front end of an automotive vehicle frame to absorb frontal impact energy, comprising an elongated first crush hoop having a central portion and side portions extending rearwardly from said central portion in horizontally spaced apart relation and each having a rear end for operable connection to and support by the front end of the vehicle frame, and an elongated second crush hoop vertically spaced from said first crush hoop having a central portion and side portions extending rearwardly from the central portion thereof in horizontally spaced apart relation and each having a rear end oriented for operable connection to and support by the front end of the vehicle frame, the central portion of said first crush hoop also being horizontally as well as vertically spaced apart from the central portion of said second crush hoop and projecting forwardly away from the vehicle front end by a greater distance than that of the central portion of said second hoop, said first and second hoops, when operably connected to and supported by the front end of the vehicle frame, being frontally unobstructed by one another and supported independently of one another and thereby adapted to crush and collapse initially sequentially to thereby smoothly, continuously and progressively absorb energy in a frontal impact as said first and then both of said crush hoops are independently loaded and deformed in a frontal impact, and further comprising horizontally spaced apart first and second crush boxes, the side portions of each of said hoops having their rear ends operably secured for support to a respectively associated front end of each of said respective first and second crush boxes, said first and second crush boxes being constructed and arranged when in use on the front end of the vehicle frame to crush and collapse to absorb energy in a frontal impact, and mounting means for securing a rear end of each of said crush boxes to the vehicle frame.

12. Automotive front end structure as defined in claim 11, wherein said crush boxes are hollow.

13. Automotive front end structure as defined in claim 12, wherein said crush boxes comprise aluminum extrusions.

14. Automotive front end structure as defined in claim 13 wherein the central portion of said first crush hoop is arcuately and outwardly convex and the side portions thereof flare laterally outwardly in a rearward direction, and the central portion of said second crush hoop is blunt and the side portions thereof are arcuate and outwardly convex and flare laterally outwardly in a rearward direction.

15. Automotive front end structure as defined in claim 14, wherein said hoops are disposed in vertically spaced, horizontal planes.

16. Automotive front end structure as defined in claim 15, wherein said crush hoops are free of connection to one another except at their rear ends.

17. Automotive front end structure as defined in claim 1 wherein the central portion of said first crush hoop is arcuately and outwardly convex and the side portions thereof flare laterally outwardly in a rearward direction, and the central portion of said second crush hoop is blunt and the side portions thereof are arcuate and outwardly convex and flare laterally outwardly in a rearward direction.

18. Automotive front end structure as defined in claim 17, wherein said hoops are disposed in vertically spaced, horizontal planes.

* * * * *